US007331214B2

(12) United States Patent
Aliakbarzadeh et al.

(10) Patent No.: US 7,331,214 B2
(45) Date of Patent: Feb. 19, 2008

(54) METHOD FOR ADAPTING THE DETECTION OF A MEASURING SIGNAL OF A WASTE GAS PROBE

(75) Inventors: Reza Aliakbarzadeh, Regensburg (DE); Tino Arlt, Regensburg (DE); Gerd Rösel, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/587,630

(22) PCT Filed: Nov. 23, 2004

(86) PCT No.: PCT/EP2004/053065

§ 371 (c)(1), (2), (4) Date: Jul. 28, 2006

(87) PCT Pub. No.: WO2005/073543

PCT Pub. Date: Aug. 11, 2005

(65) Prior Publication Data

US 2007/0119436 A1 May 31, 2007

(30) Foreign Application Priority Data

Jan. 28, 2004 (DE) ...................... 10 2004 004 291

(51) Int. Cl.
*G01M 15/10* (2006.01)

(52) U.S. Cl. ..................................... 73/23.32; 73/118.1

(58) Field of Classification Search ............... 73/23.31, 73/23.32, 116, 117.2, 117.3, 118.1
See application file for complete search history.

(56) References Cited

U.S. PATENT DOCUMENTS

| | | | | |
|---|---|---|---|---|
| 4,495,924 | A | 1/1985 | Ueno et al. | |
| 6,439,038 | B1 * | 8/2002 | Rosel et al. | 73/117.3 |
| 6,901,741 | B2 * | 6/2005 | Kobayashi et al. | 60/274 |
| 2002/0088446 | A1 | 7/2002 | Wachi et al. | |
| 2002/0139354 | A1 | 10/2002 | Tsuchihashi | |
| 2003/0014967 | A1 | 1/2003 | Daetz et al. | |
| 2003/0110845 | A1 | 6/2003 | Kumagai et al. | |
| 2006/0089779 | A1 * | 4/2006 | Geyer et al. | 701/101 |
| 2006/0260592 | A1 * | 11/2006 | Rosel et al. | 123/673 |

FOREIGN PATENT DOCUMENTS

| | | | |
|---|---|---|---|
| DE | 199 03 721 | C1 | 7/2000 |
| DE | 102 06 402 | C1 | 4/2003 |
| DE | 103 04 245 | B3 | 7/2004 |
| JP | 57140529 | A | 8/1982 |
| WO | WO 90/02874 | A1 | 3/1990 |

* cited by examiner

*Primary Examiner*—Eric S. McCall

(57) ABSTRACT

The invention relates to a waste gas probe which is disposed in an internal combustion engine, comprising a plurality of cylinders and injection valves associated with the cylinders, in order to measure fuel. The waste gas probe is arranged in a waste gas tract and the measuring signal thereof is characteristic for the air/fuel ratio in the respective cylinder. The measuring signal is detected in relation to a reference position of the piston of the respective cylinder at a predefined crankshaft angle and associated with a respective cylinder. A manipulated variable which is used to influence the air/fuel ration in the respective cylinder according to the measuring signal detected for the respective cylinder is produced by a controller. The predefined crankshaft angle is adapted according to an instability criterion of the controller.

17 Claims, 5 Drawing Sheets

METHOD FOR ADAPTING THE DETECTION OF A MEASURING SIGNAL OF A WASTE GAS PROBE

CROSS REFERENCE TO RELATED APPLICATIONS

This application is the U.S. National Stage of International Application No. PCT/EP2004/053065, filed Nov. 23, 2004 and claims the benefit thereof. The International Application claims the benefits of German Patent application No. 10 2004 004 291.8 filed Jan. 28, 2004. All of the applications are incorporated by reference herein in their entirety.

FIELD OF THE INVENTION

The invention relates to a method for adapting the detection of a measuring signal of a waste gas probe which is disposed in an internal combustion engine comprising a plurality of cylinders and injection valves associated with the cylinders which supply measured amounts of fuel. The waste gas probe is arranged in a waste gas tract and the measuring signal thereof is characteristic for the air/fuel ratio in the respective cylinder.

BACKGROUND OF THE INVENTION

Ever more stringent regulations regarding permissible pollutant emissions by motor vehicles fitted with internal combustion engines make it necessary to keep the pollutant emissions as low as possible during operation of the internal combustion engine. One of the ways in which this can be done is by reducing the emissions which occur during the combustion of the air/fuel mixture in the relevant cylinder of the internal combustion engine. Another is to use waste gas handling systems in internal combustion engines which convert the emissions which are generated during the combustion process of the air/fuel mixture in the relevant cylinder into harmless substances. Catalyzers are used for this purpose, which convert carbon monoxide, hydrocarbons and nitrous oxide into harmless substances. Both the explicit influencing of the generation of the pollutant emissions during the combustion and also the conversion of the pollutant components with a high level of efficiency by an exhaust gas catalyzer require a very precisely set air/fuel ratio in the respective cylinder.

The later published patent application DE 103 04 245 B3 discloses a method for adapting signal sampling of Lambda probe signal values for use in a cylinder-selective Lambda control for a multi-cylinder internal combustion engine. A Lambda probe records the oxygen values in the waste gas for individual cylinders in the waste gas tract at predefined points in time. From the Lambda values measured in this way for individual cylinders control deviations for the cylinders are reconstructed from which a characteristic value is computed. The times for measuring the Lambda values of the individual cylinders are related to the crankshaft angle such that the characteristic value assumes an extreme value.

A method for cleansing waste gas is known from US 2003/0014967 A1 in conjunction with a waste gas system. A gas sensor is arranged so that it is subjected to a passing stream of waste gas and this occurs in chronological sequence from the respective cylinders. A time characteristic of the sensor signal includes information about the air/fuel ratio of the individual cylinders (see paragraph 0012). A control device can also comprise a cylinder-selective injection system with which the air/fuel ratio can be individually adapted to the individual cylinders. To this end the injection time is influenced in a cylinder-selective manner. From US 2002/0139354 A1 (D2) controlling a simultaneous injection of fuel into all cylinders after the start of the internal combustion engine is known. A cylinder identification means is provided to identify the individual cylinders based on the crankshaft angle and in this case to generate a cylinder identification signal. A fuel dispensing control means to control the fuel injection valves of the individual cylinders is provided, based on the crankshaft angle signal. A fuel injection volume correction means is provided for correcting the activation periods of the injection valves.

From the Patent Abstracts of Japan for JP 57 140 529 A method for deactivation of cylinders in an internal combustion engine with a plurality of cylinders is known in which for a down shift of a gear a check is made as to whether fuel supply is to be suppressed to all cylinders or merely to one cylinder group.

U.S. Pat. No. 4,495,924 discloses a fuel injection control system with means for computing an injection start in relation to a crankshaft angle and for computing the duration of the fuel-injection. An injection signal means is provided for each cylinder to generate an injection signal which increases at the point of the computed start time of the injection and which has a duration which corresponds to the computed duration of the fuel injection.

A method is known from US 2003/0110845 A1 for detecting misfires, and this is done for each cylinder. For a cylinder with misfires the fuel delivery is suppressed. An error in the mechanism is determined if a parameter based on the oxygen concentration indicates a richer value of the current air/fuel mixture of the waste gas than a predefined reference value makes this.

A method is known from US 2002/0088446 in which an air/fuel ratio detection period is predefined in relation to an air/fuel ratio sensor which includes waste gas packets of all cylinders. Depending on a peak value phase, which is maximized on a rich or a lean side, induced by variations of the air/fuel ratio, a cylinder is determined, in which the air/fuel ratio is to be corrected and the fuel delivery is adapted accordingly.

A method is know from DE 102 06 402 C1, in which for a global Lambda setpoint, which is provided for all cylinders, the excitation amplitude is added to one of the cylinders. A first injection correction for the cylinder is computed from the excitation time. The added Lambda value is delayed and/or filtered and subtracted as Lambda setpoint value for the cylinder from the actual Lambda value for the cylinder. The difference is applied as control deviation to a Lambda controller which determines a second injection correction for the cylinder.

WO 90/02874 discloses a method for detecting misfires of an internal combustion engine with a plurality of cylinders, in which the output voltage of a Lambda sensor is monitored in the exhaust system and compared with a reference voltage. A deviation of the difference between the sensor and the reference voltage from an expected value is signaled as a misfire in at least one of the cylinders. An expected gas delay time is determined as a function of an empirically determined engine map which is stored on a computer.

A method for a multi-cylinder internal combustion engine for cylinder-selective controlling of an air/fuel mixture to be burnt is known from DE 199 03 721 C1, in which the Lambda values for different cylinders or cylinder groups are sensed and controlled separately. To this end a probe evaluation unit is provided, in which a time-triggered evaluation of the waste gas probe signal is undertaken and thus a cylinder-selective Lambda value for each cylinder of the internal combustion engine determined. Each cylinder is assigned an individual controller which is embodied as a PI or PID controller and for which the control variable is a cylinder-individual Lambda value and of which the guide variable is a cylinder-individual setpoint value of the Lambda. The manipulated variable of the relevant controller then influences the injection of the fuel into the relevant assigned cylinder.

The quality of the cylinder-individual Lambda regulation is decisively dependent on how precisely the measuring signal of the waste gas probe is assigned to the waste gas of the relevant cylinder. During the operation of the waste gas probe its response behavior can change and thus also the degree of precision of the assignment of the measuring signal of the waste gas probe to the waste gases of the respective cylinder.

SUMMARY OF THE INVENTION

The object of the invention is to create a method for adapting detection of a measuring signal of a waste gas probe which, over a long operating life, allows simple and precise control of an internal combustion engine in which the waste gas probe can be disposed.

The object is achieved by the features of the independent claims. Advantageous embodiments of the invention are identified in the subclaims.

The outstanding feature of the invention is a method and a corresponding device for adapting the detection of a measuring signal of a waste gas probe. The waste gas probe is disposed in an internal combustion engine comprising a plurality of cylinders and with injection valves assigned to the cylinders which deliver fuel. The waste gas probe is arranged in a waste gas tract of the internal combustion engine and the measuring signal thereof is characteristic for the air/fuel ratio in the respective cylinder.

The measuring signal is detected and assigned to the respective cylinder for a predefined crankshaft angle, in relation to a reference position of the piston in the respective cylinder. A manipulated variable for influencing the air/fuel ratio in the respective cylinder is generated by means of a controller in each case depending on the measuring signal detected for the respective cylinder. The predefined crankshaft angle is adapted as a function of an instability criterion of the controller.

The invention is based on the surprising knowledge that the control quality of the controller is only influenced decisively by the crankshaft angle at which the measuring signal is detected if an instability criterion is fulfilled, that is if the controller is operating unstably. The invention makes use of the knowledge by adapting the predefined crankshaft angle as a function of the instability criterion of the controller. The adaptation can be very simple and at the same time can be undertaken very rapidly and thus guarantees a high a control quality of the controller in a simple manner.

In an advantageous embodiment of the invention the instability criterion depends on the manipulated variable or variables of the controller assigned to the respective cylinder and/or further controllers which are assigned to other cylinders. Thus the measuring signal can be adapted especially simply and quickly.

In a further advantageous embodiment of the invention the instability criterion is fulfilled if the manipulated variable or the manipulated variables respectively is or are the same for a predefined period as their maximum limit value to which they are limited by the controller or the controllers respectively, or is or are the same as their minimum limit value to which they are limited by the controller or controllers respectively. This makes it possible to detect in a simple manner whether the control is unstable and then make a corresponding adjustment to the predefined crankshaft angle.

In a further advantageous embodiment of the invention it is necessary to fulfill the instability criterion, for all manipulated variables to be the same for the predefined period as their maximum fine to which they are limited by the controller or to be the same as their minimum value to which they are limited by the controller, and for this to apply to the manipulated variables of all cylinders. This enables the instability of the controller to be detected in an especially reliable manner, and in particular prevents a component error, for example that of the injection valve, being incorrectly detected as an instability of the controller.

In a further advantageous embodiment of the invention it is necessary to fulfill the instability criterion, that with an even number of cylinders the one half of the manipulated variables is equal to the maximum value and the other half is equal to the minimum value, and with an odd number of cylinders a first number of manipulated values is equal to the maximum value and a second number of manipulated values is equal to the minimum value, in which case the first number differs from the second by one and the sum of the first and second numbers is equal to the odd number of cylinders. This is based on the knowledge that this is characteristic of an unstable controller with an even number of cylinders and accordingly with an odd number of cylinders.

In a further advantageous embodiment of the invention an error of the injection valve or of an actuating element is detected which exclusively influences the air feed to the respective cylinder if the manipulated variable of the respective cylinder is equal for a predefined period to its maximum value to which it is limited by the controller or is equal to its minimum value to which it is limited by the controller, and at least one manipulated variable which is assigned to another cylinder is not equal to the maximum value or the minimum value. This additionally allows an error of an injection valve to be detected and the crankshaft angle of the detection of the measuring signal to not be changed incorrectly.

In a further advantageous embodiment of the invention the instability criterion is fulfilled if at least the manipulated variable assigned to a cylinder oscillates at an amplitude which is greater than a predefined amplitude threshold. Thus the instability of the controller can be securely detected, especially for an odd number of cylinders.

In a further advantageous embodiment of the invention the controllers each feature a monitor which determines a status variable depending on the measuring signal of the waste gas probe detected, in which case a variable characterizing the status variable of the monitor is fed back and for which the instability criterion depends on one or more of the status variables. This enables the instability criterion to be particularly simple.

Further advantageous embodiments of the invention in respect of the status variable or the status variables correspond to those in relation to the manipulated variable or the manipulated variables and have the same advantages.

It is further advantageous for the adaptation of the predefined crankshaft angle to be undertaken using a step which corresponds to a predefined fraction of the expected stability range of the controller. The fraction is preferably selected as about ⅓ of the expected stability range of the controller.

This enables the predefined crankshaft angle to be adapted very quickly and this can be done in accordance with the selected increment, and at the same time a lower computing overhead is necessary since it is only important that the stability range be achieved.

If the measuring signal of the waste gas probe is characteristic for the air/fuel ratio in the respective cylinder of a first part of all cylinders and a further waste gas probe is provided for which the measuring signal is characteristic for the air/fuel ratio in the respective cylinder of a second part of all cylinders, the adaptation of the detection of the measuring signal and of the further waste gas probe are advantageously undertaken separately and related in each case to the first part or the second part of all cylinders respectively.

BRIEF DESCRIPTION OF THE DRAWINGS

Exemplary embodiments of the invention are explained below with reference to schematic diagrams. The figures show.

Elements for which the construction and function are the same are labeled by the same reference symbols in all figures.

DETAILED DESCRIPTION OF THE INVENTION

Figure 1:
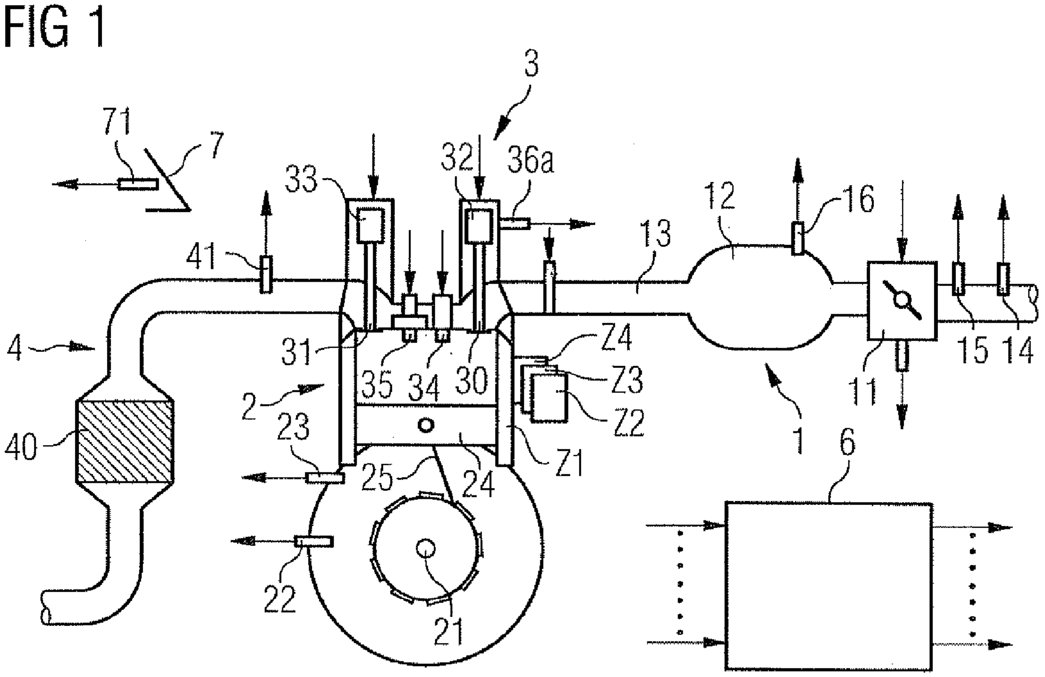
FIG. 1 a internal combustion engine with a control device.

An internal combustion engine (FIG. 1) comprises an induction tract 1, an engine block 2, a cylinder head 3 and a waste gas tract 4. The induction tract 1 preferably comprises a throttle valve 11, also a collector 12 and an induction pipe 13, which is routed through to the cylinder Z1 via an inlet channel in the engine block 2. The engine block 2 further comprises a crankshaft 21, which is coupled via a connecting rod 25 to the piston 24 of the cylinder Z1.

The cylinder head 3 comprises a valve drive with a gas inlet valve 30, a gas outlet valve 31 and valve drives 32, 33. The cylinder head 3 further comprises an injection valve 34 and a spark plug 35. Alternatively the injection valve can also be arranged in the induction channel.

The waste gas tract 4 comprises a catalyzer 40, which is preferably embodied as a three-way catalyzer. A waste gas return line can be routed back to the induction tract 1 from the waste gas tract 4, especially back to the collector 12.

In addition a control device 6 is provided to which sensors are assigned which detect different measuring variables and determine the measured value of the measuring variable in each case. Depending on at least one of the measuring variables, the control device 6 controls the actuation elements by means of corresponding actuation drives.

The sensors are a pedal positions sensor 71, which detects the position of the gas pedal 7, an air mass measurer 14, which detects an air mass stream upstream from the throttle valve 11, a temperature sensor 15. which detects the induction air temperature, a pressure sensor 16, which detects the induction pipe pressure, a crankshaft angle sensor 22, which detects a crankshaft angle to which a speed N is then assigned, a further temperature sensor 23, which detects a coolant temperature, a camshaft angle sensor 36*a*, which detects the camshaft angle and a waste gas probe 41, which detects a residual oxygen content of the waste gas and of which the measuring signal is characteristic for the air/fuel ratio in the cylinder Z1. The waste gas probe 41 is a preferably embodied as a linear Lambda probe and thus generates over a wide range of the air/fuel ratio, in measuring signal proportional to this.

Depending on the form of embodiment of the invention any given subset of the said sensors or also additional sensors can be present.

The actuating elements are for example the throttle valve 11, the gas inlet and gas outlet valves 30, 31, the injection valve 34 and the spark plug 35.

As well as the cylinder Z1 further cylinders Z2-Z4 are also provided to which corresponding actuation elements are also assigned. Preferably a waste gas probe is assigned to each waste gas bank of cylinders. Thus the internal combustion engine can comprise six cylinders for example with three cylinders being assigned to one waste gas bank and correspondingly to one waste gas probe 41 in each case.

Figure 2:
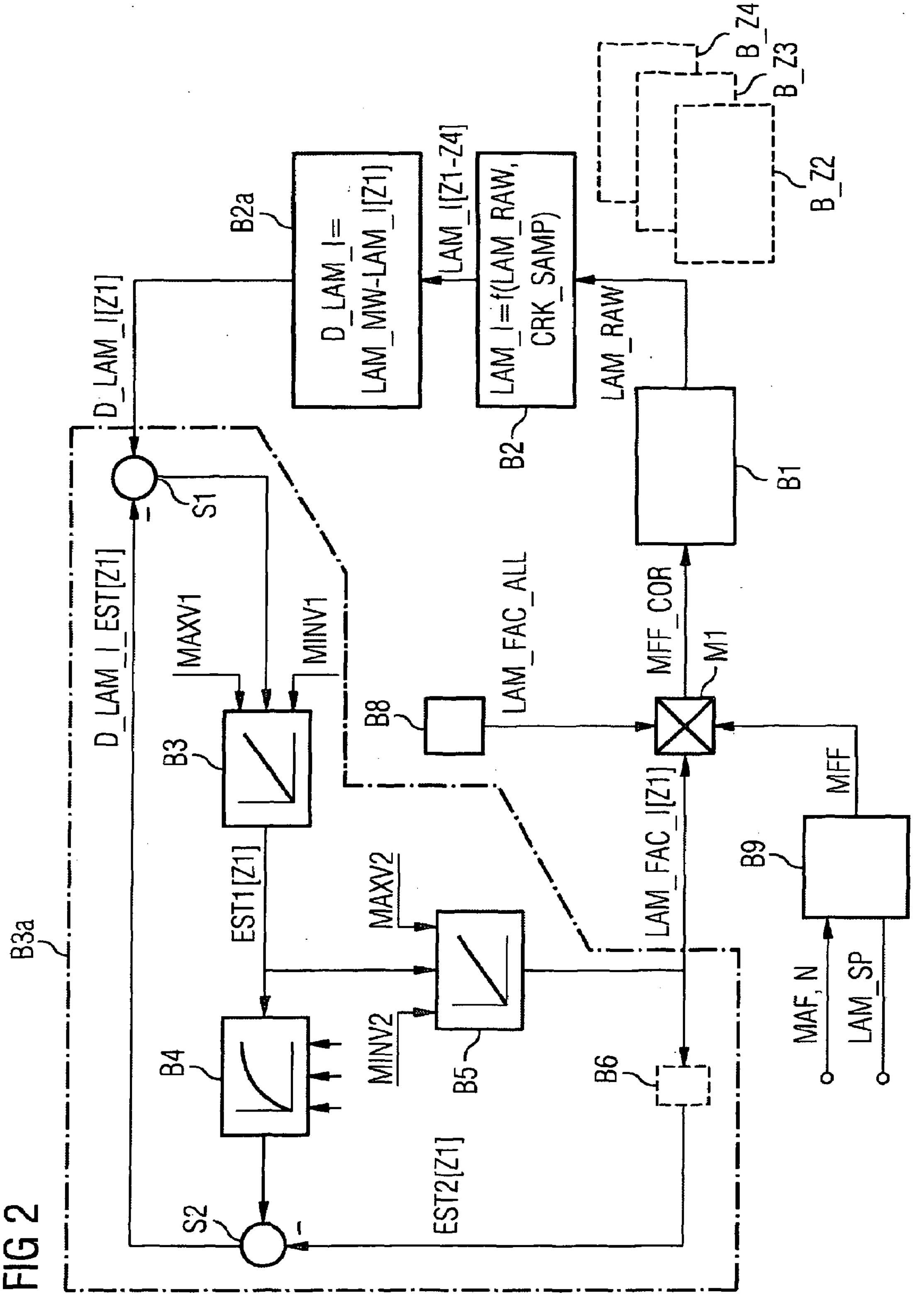
FIG. 2 a block diagram of the control device.

A block diagram of parts of the control device 6 which can be referred to as a unit for controlling the internal combustion engine is shown with reference to FIG. 2.

A block B1 corresponds to the internal combustion engine. An air/fuel ratio LAM_RAW detected by the waste gas probe 41 is fed to a block B2. At predefined crank-shaft angles CRK_SAMP respectively, in relation to a reference position of the respective piston of the respective cylinder Z1 to Z4, an assignment is then undertaken in the block B2 of the air/fuel ratio currently detected at this point in time which is derived from the measuring signal of the waste gas probe 41, to the relevant air/fuel ratio of the respective cylinder Z1 to Z4 and thus the cylinder-individually detected air/fuel ratio LAM_I [Z1-Z4] I assigned.

The reference position of the relevant piston 24 is preferably its top dead center. The predefined crankshaft angle CRK_SAMP is for example applied as a fixed value the first time that the internal combustion engine is put into service and is subsequently adapted where necessary on the basis of the programs described below.

In a block B2*a*an average air/fuel ratio LAM_MW is determined by averaging the air/fuel ratios LAM_I [Z1-Z4] detected for the individual cylinders. Furthermore in the block B2*a*an actual value D_LAM_I [Z1] of a deviation of an individual cylinder air/fuel ratio is determined from the difference between the average air/fuel ratio LAM_MW and the air/fuel ratio detected for the individual cylinder LAM_I [Z1]. This is then fed to a controller which is formed by block B3*a*.

In a summation unit S1 for the difference between the indicated value D_LAM_I [Z1] and an estimated value D_LAM_I_EST [Z1] of the cylinder-individual air/fuel ratio the deviation is determined and then assigned to a block B3 which is part of the monitor and comprises an integration element which integrates the variables present at its input. The I-element of the block B3 then makes a first estimated value EST1 [Z1] available at its output. The first estimated value EST1 [Z1] is limited in the integration element of block B3 to a minimum value MINV1 and a maximum value MAXV1 which are preferably fixed.

The first estimated value EST1[Z1] is then fed to a delay element which is also a component of the monitor which is embodied in the block B4. The delay element is preferably embodied as a PT1 element. Where necessary the first estimated values EST1[Z2-Z4], in relation to the further cylinders [Z2-Z4] in each case are also fed to the delay element.

The first estimated value EST1[Z1] forms a status variable of the monitor.

The first estimated value EST1[Z1] is also fed to a block B5 in which a further integrator element is embodied, which integrates the first estimated value EST1[Z1] and then creates at its output a cylinder-individual Lambda control factor LAM_FAC_I [Z1] as manipulated variable of the controller. In the I element of the block B5 the cylinder-individual Lambda control factor LAM_FAC_I [Z1] is limited to a maximum value MAXV2 and a minimum value MINV2.

The second estimated value EST2 [Z1] depending on the cylinder-individual Lambda control factor LAM_FAC_I [Z1] is determined in a block B6. This is done especially simply by setting the second estimated value EST2 [Z1] equal to the cylinder-individual Lambda control factor LAM_FAC_I [Z1]. In the summation unit S2 the difference between the first estimated value EST1 [Z1 ]filtered via the delay element of the block B4 and the second estimated value EST2 [Z1] is formed and fed back as estimated value D_LAM_I_EST [Z1] of the cylinder-individual air/fuel ratio deviation to the summation unit S1 and subtracted here from the current value D_LAM_I [Z1] of the respective air/fuel ratio deviation and coupled back and then injected again into the block B3.

A Lambda controller in provided in block B8, for which the guide value is an air/fuel ratio predefined for all cylinders of the internal combustion engine and for which the control variable is the average air/fuel ratio LAM_MW The manipulated variable of the Lambda controller is a Lambda control factor LAM_FAC_ALL. The Lambda controller thus has the task of setting the predefined air/fuel ratio viewed over all cylinders Z1 to Z4 of the internal combustion engine.

Alternatively this can also be achieved by determining from block B2 the current value D_LAM_I of the cylinder-individual air/fuel ratio deviation from the difference of the air/fuel ratio predefined for all cylinders Z1 to Z4 of the internal combustion engine and the cylinder-individual air/fuel ratio LAM_I[Z1-Z4]. In this case the third controller of block B8 can then be omitted.

In a block B9 a measured fuel flow MFF depending on a mass air flow MAF in the relevant cylinder Z1 to Z4 and where necessary the speed N and a setpoint value LAM_SP of the air/fuel ratio for all cylinders Z1-Z4 can be determined.

In the multiplier unit M1 a corrected mass fuel flow MFF_COR is determined by multiplying the mass fuel flow MFF, the Lambda control factor LAM_FAC_ALL and the cylinder-individual Lambda control factor LAM_FAC_I [Z1]. Depending on the corrected measured fuel flow MFF_COR, a control signal is then generated which controls the respective injection valve 34.

As well as the controller structure shown in the block diagram of FIG. 2, the corresponding controller structures B_Z2 to B_Z4 are provided in each case for the respective further cylinders Z2 to Z4 for each further cylinder Z1 to Z4.

Alternatively a proportional element can also be embodied in block B5.

Figure 3:
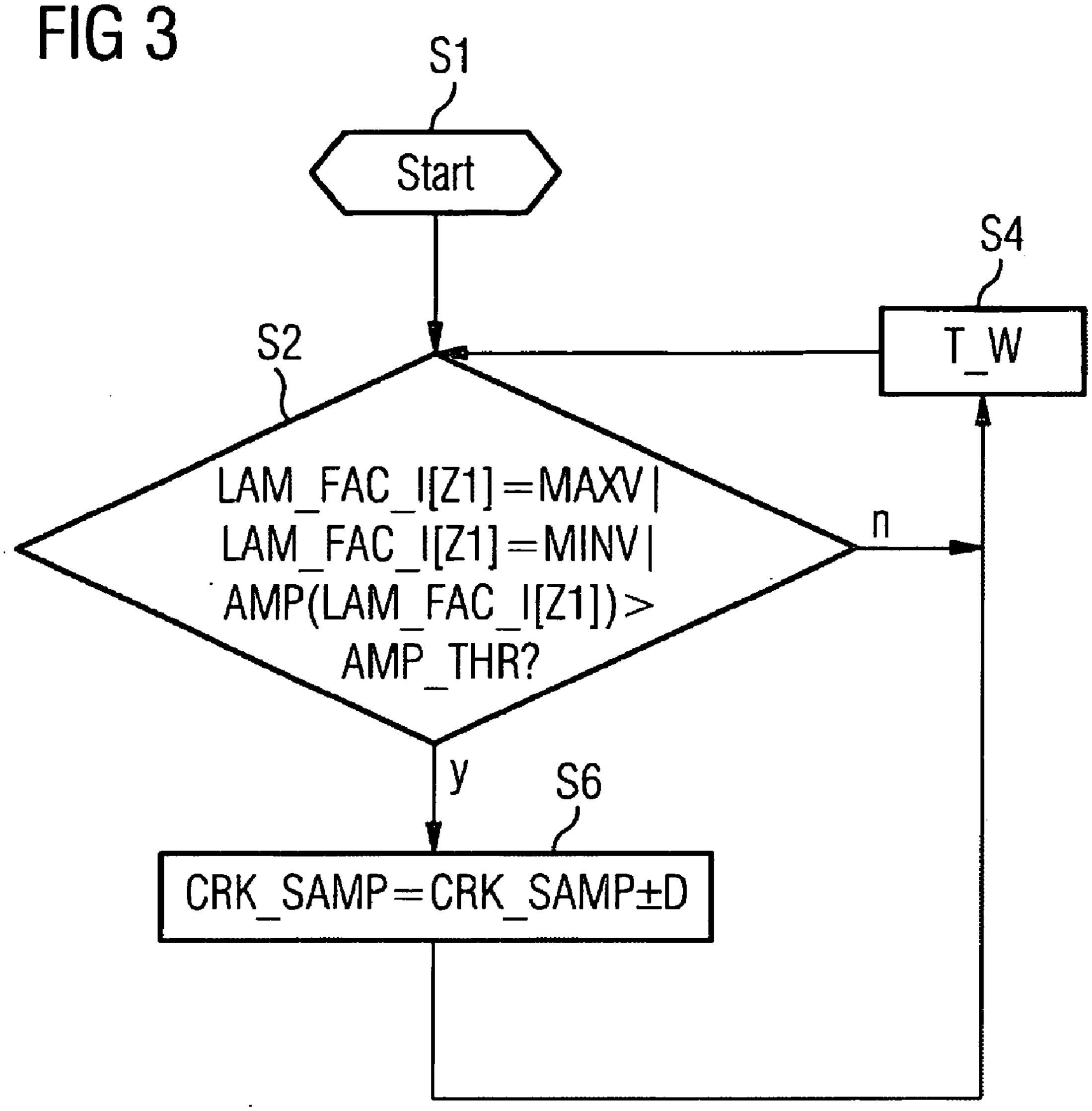
FIG. 3 a first flowchart of a program for adapting at the detection of a measuring cylinder of a waste gas probe, FIG. 4 a further program for adapting the detection of the measuring signal of the waste gas probe and FIG. 5 a further flowchart of a program for adapting the detection of the measuring signal of the waste gas probe.

A program for adapting the detection of the measurement signal of the waste gas probe 41 is started in a step S1, preferably close to the time at which internal combustion engine is started. In step S1 variables are initialized if necessary (FIG. 3).

In a step S2 a check is performed as to whether the cylinder-individual Lambda control factor LAM_FAC_I [Z1], which is assigned to the cylinder Z1 is the same as the maximum value MAXV2 or a minimum value MINV2 and if it is in this state for a predefined period lasting for example between five and ten seconds, or whether the amplitude AMP of the cylinder-individual Lambda control factor LAM_FAC_I [Z1], which is assigned to the cylinder Z1 exceeds a predefined amplitude threshold AMP_THR. If this is not the case an instability criterion is deemed not to be fulfilled and the processing is continued in a step S4 in which the program is interrupted for a predefined waiting time T_W before the step S2 condition is tested again.

If on the other hand the step S2 condition is fulfilled, the instability criterion is deemed to be fulfilled and the predefined crankshaft angle CRK_SAMP in relation to the reference position of the piston 24 of the respective cylinder Z1 to Z4, in which the measuring signal of the waste gas probe 41 was detected is assigned to the relevant cylinder, is adapted in the step S6, preferably by the predefined crankshaft angle CRK_SAMP being either decreased or increased by a predefined angle of change D. The angle of change D is preferably a predefined fraction of the expected range of crankshaft angles within which the control is stable This expected range of crankshaft angles is preferably determined empirically and this is done when the internal combustion engine is new. For a 4-cylinder internal combustion engine the crankshaft angle can be 180° for example. The angle of change D is preferably a large angle in relation to the crankshaft angle range and amounts for example to 20% of the crankshaft angle range, that is to a crankshaft angle of around 40°. The direction of adaptation of the predefined crankshaft angle CRK_SAMP is preferably determined by two or more consecutive executions of the steps S2 and S6, taking into account the starting state, that is the instability criterion with different leading signs of the angle of change D.

The preferably large increment of the adaptation of the predefined crankshaft angle CRK_SAMP as a result of the large angle of change D enables the stable range of control to be found within very few executions of the steps S2 and S6, a range which is characterized by the fact that the instability criterion of step S2 is not fulfilled.

As a result of the knowledge that the quality of the control is approximately the same within the stability range, a search for an optimum quality of control which is expensive in terms of computing and time can be dispensed with and thereby a very high-quality control set within a very short time.

Figure 4:
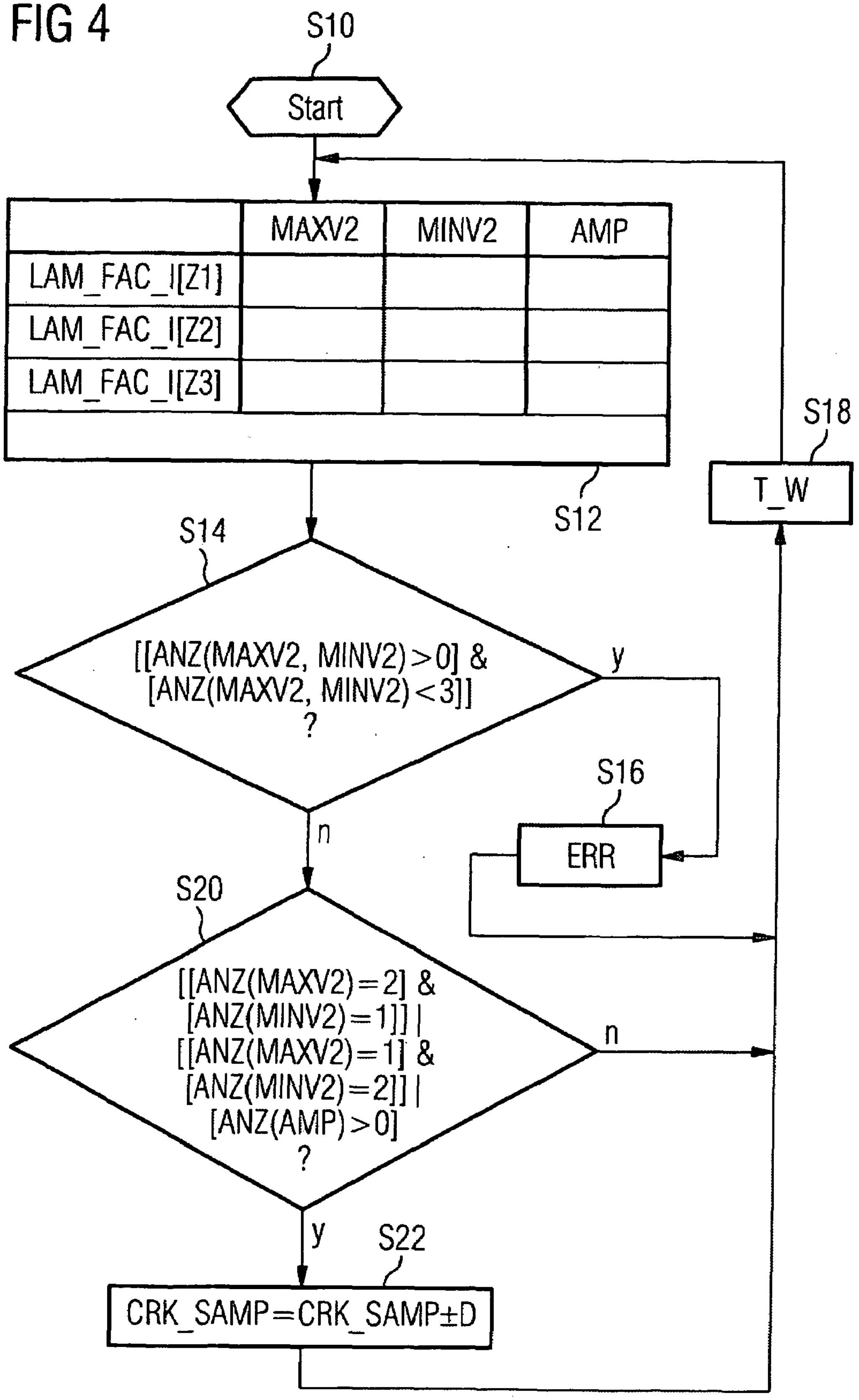

A second embodiment of a program for adapting the detection of the measuring signal of the waste gas probe 41 is shown with reference to FIG. 4. The program is started in a step S10 in which variables are initialized where necessary. It is typically described for an internal combustion engine in which three cylinders Z1-Z3 are assigned a waste gas probe 41. This can for example be the case for an internal combustion engine with three cylinders Z1-Z3 or also for an internal combustion engine with six cylinders in which the waste channels of three cylinders Z1-Z3 are routed to a waste gas probe 41 in each case. With this type of internal combustion engine with six cylinders the program is then executed for each three cylinders once in parallel, in accordance with the following steps. The program is however also suitable for execution if the relevant waste gas probe 41 is assigned to a different number of cylinders, in which case the conditions are then adapted according to this number.

In the step S12 the cylinder-individual Lambda control factors LAM_FAC_I [Z1], LAM_FAC_I [Z2], LAM_FAC_1 [Z3], which are assigned to the cylinders Z1 to Z3, are checked as to whether they assume the maximum value MAXV2 or the minimum value MINV2 for the predefined period, or whether their timing oscillates with amplitude AMP which is greater than the predefined amplitude threshold AMP_THR.

In a simple embodiment of step S12 the amplitude AMP can also be determined in each case by detecting the maximum and minimum values of the timing sequence of the cylinder-individual Lambda control factor LAM_FAC_I [Z1 to Z3] occurring during the predefined period and equating their difference with the amplitude AMP.

in a step S14 a check is subsequently undertaken as to whether the number of cylinder-individual Lambda control factors LAM_FAC_I [Z1 to Z3], which were detected in step S12 were equal for the predefined period, that the maximum value MAXV2 or minimum value MINV2 is greater than zero and simultaneously the number is less than three.

If this is the case, an error of a component is detected in a step S16. This component can be the respective injection valve 34 of the cylinder or cylinders Z1-Z3 for which the cylinder-individual Lambda control factor LAM_FAC_I [Z1 to Z3] has assumed the maximum value MAXV2 or the minimum value MINV2 for the predefined period. This is based on the knowledge that, if not all cylinder-individual Lambda control factors LAM_FAC_I [Z1 to Z3] which are each assigned a waste gas probe 41, but only some of them assume the maximum value MAXV2 or the minimum value MINV2, this is not to be attributed to an instability of controller but to an error in a component. The component can be the respective injection valve or also an actuating element which exclusively influences the air fed to the respective cylinder Z1-Z3. This type of actuating element can for example be the inlet valve 30 or also what is known and a pulse charge valve.

In the step S16 for example an emergency mode of the internal combustion engine can then be activated or if necessary measures can also be taken to rectify the error of the component. After step S16 processing is continued in step S18 in which the program is interrupted for the predefined waiting time T_W before the processing is continued again in step S12.

If on the other hand the condition of step S14 is not fulfilled, an instability criterion is checked in a step S20. A check is undertaken in step S20 as to whether the number ANZ of the cylinder-individual Lambda control factors LAM_FAC_I [Z1 to Z3], which for the predefined period in the step S12 have assumed the maximum value MAXV2, is equal to two and the corresponding number of those which have assumed the minimum value MINV2 is equal to one or the number ANZ of those which have assumed the maximum value MAXV2 is equal to one or the number of those which have assumed the minimum value MINV2 is equal to two, or the number of those cylinder-individual Lambda control factors LAM_FAC_I [Z1 to Z3], of which the amplitude AMP is greater than the amplitude threshold AMP_THR, is greater than zero.

If the condition of step S20 and thereby of the instability criterion is not fulfilled, processing is continued at step S18.

The condition of step S20 is based on the knowledge that, in the case of an instability of control for an odd number of cylinders, all cylinder-individual Lambda control factors LAM_FAC_I [Z1 to Z3] assume either a maximum value MAXV2 or the minimum value M1NV2 and in addition one part assumes the minimum value M1NV2 and the other part assumes the maximum value MAXV2, with the number of those which assume the maximum value MAXV2 only differing by one from the number which assume the minimum value MINV2. For an even number of cylinders in this case precisely one half of the cylinder individual Lambda control factors LAM_FAC_I [Z1 to Z3] are equal to the maximum value MAXV2 and the other half are equal to the minimum value MINV2. Investigations have shown that especially with an add number of cylinders there is an instability of the control even if the amplitude AMP of the oscillation of the sequence of the respective cylinder-individual Lambda control factors LAM_FAC_I [Z1 to Z3] is greater than the predefined amplitude threshold AMP_THR, which preferably corresponds to around two thirds of the difference between the maximum value MAXV2 and of the minimum value MINV2.

If the condition of step S20 is fulfilled, the predefined crankshaft angle CRK_SAMP is adapted in a step S22 in accordance with step S6. After step S22 the processing of the program is continued at step S18.

Figure 5:
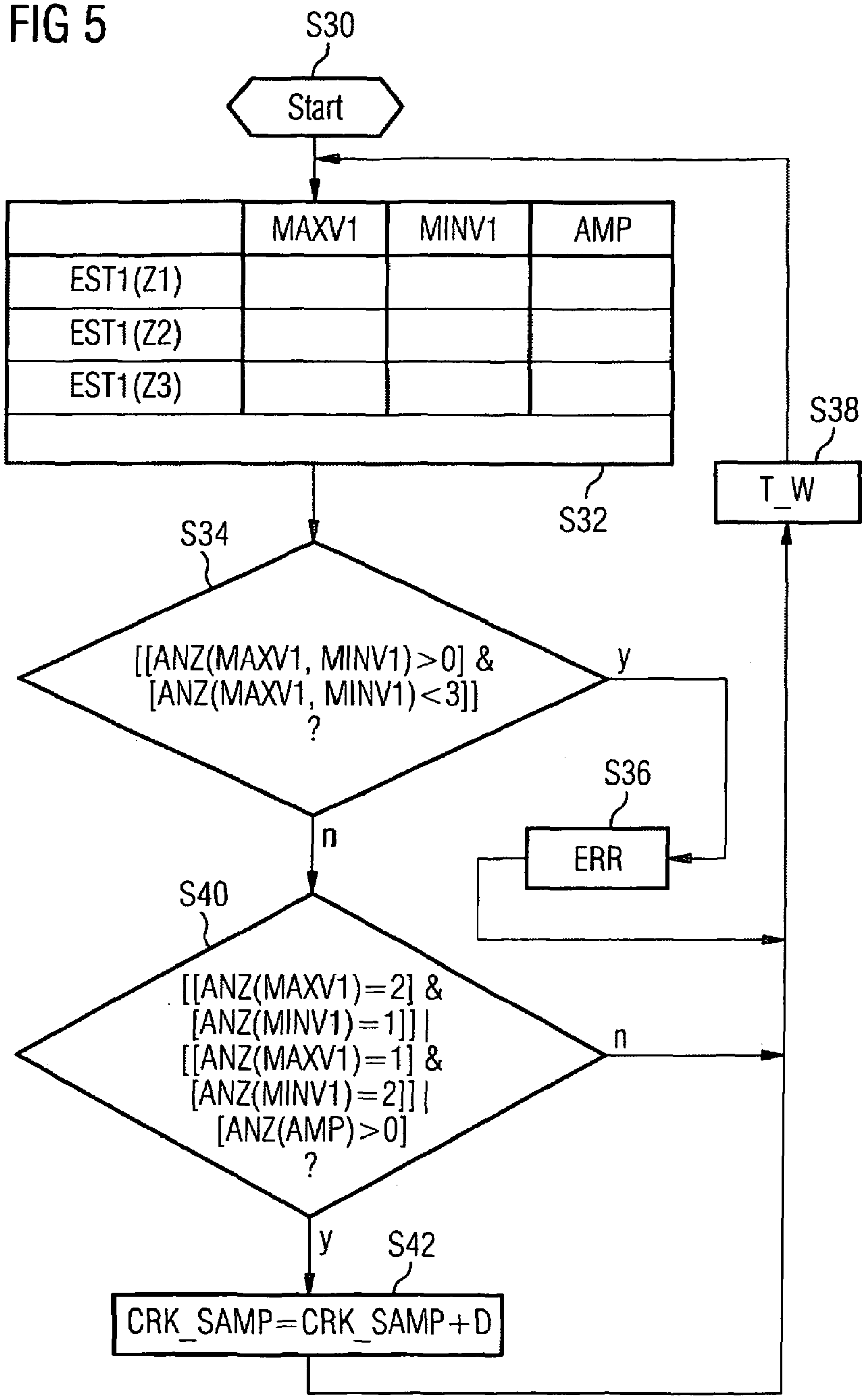

A further embodiment of the program for adapting the detection of the measuring signal of the waste gas probe 41 is described below with reference to FIG. 5, with only the differences from the embodiment in accordance with FIG. 4 being explained. The program is started in a step S30. Subsequently a step S32 is processed, which is like step S12. By contrast with step S12, the time sequences of the first estimated value EST1 [Z1 to Z3] in each case of the controller assigned to the relevant cylinder Z1 to Z4 are investigated as to whether, for the predefined period, they assume the maximum value MAXV1 or minimum value MINV1 or whether their timing oscillates with an amplitude AMP which is greater than the amplitude threshold AMP_THR.

Alternatively in step S32, instead of the respective first estimated value EST1, the first estimated value EST1 filtered by means of the block B4 can be investigated.

The steps S34 and S40 correspond to the steps S14 or S20 respectively with the proviso that here the conditions, instead of being in relation to the cylinder-individual Lambda control factors LAM_FAC_I [Z1 to Z3], are in relation to the respective first estimated values EST1 [Z1 to Z3]. Steps S36, S38 and S42 correspond to steps S16, S18 and S22.

The invention claimed is:

1. A method for adjusting a waste gas probe measuring signal of a multi-cylinder internal combustion engine, comprising:

pre-defining a crankshaft angle relative to a reference position of a piston in a cylinder of the engine, wherein:
- the cylinders are assigned injection valves that deliver fuel to the respective cylinders,
- the waste gas probe is arranged in a waste gas tract,
- the measuring signal is a characteristic for the air/fuel ratio in the respective cylinder, and
- the predefined crankshaft angle is adapted as a function of an instability criterion of the controller;

detecting the measuring signal;

assigning the detected measuring signal to a cylinder of the engine; and generating a variable by a controller for influencing the air/fuel ratio in the respective cylinder based on the detected measuring signal.

2. The method as claimed in claim 1, wherein additional controllers that generate additional variables are assigned to the remaining cylinders of the multi-cylinder engine.

3. The method as claimed in claim 1, wherein the instability criterion depends on the generated variable of the controller.

4. The method as claimed in claim 3, wherein the instability criterion is fulfilled if the variable is equal to either the maximum or minimum value to which the variable is limited by the controller.

5. The method as claimed in claim 3, wherein the, instability criterion is fulfilled if all generated variables are equal to either a maximum or a minimum value limited by the controller of the respective cylinder for a predefined time period.

6. The method as claimed in claim 5, wherein the instability criterion is fulfilled:

for an even number of cylinders, one half of the generated variables is equal to the maximum value limited by the respective controller and the other half of the generated variables is equal to the minimum value limited by the respective controller, and for an odd number of cylinders, a first number of generated variables is equal to the maximum value limited by the respective controller and a second number of generated variables is equal to the minimum value limited by the respective controller wherein the first number differs by one from the second number and the sum of the first and the second number are equal to the odd number of cylinders.

7. The method as claimed in claim 6, wherein an error of the injection valve or an actuating element that exclusively influences an air feed to the respective cylinder is detected if:

the generated variable of the respective cylinder is equal to either the maximum or minimum value limited by the controller for a predefined time period, and at least one generated variable is assigned to another cylinder is not equal to either the maximum or minimum value limited by the controller.

8. The method as claimed in claim 7, wherein the instability criterion is fulfilled if at least the generated variable assigned to a cylinder oscillates at an amplitude greater than a predefined amplitude threshold.

9. The method as claimed in claim 1, wherein the controller comprises a monitor that determines a status variable that depends on the detected waste gas probe measuring signal and is coupled to the instability criterion that depends at least one of the status variables.

10. The method as claimed in claim 9, wherein the instability criterion is fulfilled if all status variables are equal to either the maximum or minimum value limited by the controller of the respective cylinder of the multi-cylinder engine for a predefined time period.

11. The method as claimed in claim 9, wherein to fulfill the instability criterion it is required that all status variables of all cylinders of the multi-cylinder engine are equal to their maximum or minimum values limited by the controller for the predefined time period.

12. The method as claimed in claim 11, wherein to fulfill the instability criterion, it is required that:

with an even number of cylinders, one half of the total number of status variables are equal to a maximum value limited by the controller and the other half are equal to the minimum value limited by the controller, and with an odd number of cylinders, a first number of status variables are equal to the maximum value limited by the controller and a second number of status variables are equal to the minimum value limited by the controller where the first number differs from the second number by one and the sum of the first and the second numbers is equal to the odd number of cylinders.

13. The method as claimed in claim 12, wherein an error of the injection valve or an actuating element that exclusively influences an air feed to the respective cylinder is detected if:

the status variable of the respected cylinder is equal to either a maximum or a minimum value limited by the controller for a predefined period, and at least one generated variable is assigned to another cylinder is not equal to either the maximum or minimum value limited by the controller.

14. The method as claimed in claim 13, wherein the instability criterion is fulfilled if at least the status variable assigned to one cylinder oscillates at an amplitude greater than a predefined amplitude threshold.

15. The method as claimed in claim 14, wherein the predefined crankshaft angle corresponds to a predefined fraction of the expected stability range.

16. The method as claimed in claim 15, wherein the fraction corresponds to ⅕ of the expected stability range.

17. The method as claimed in claim 16, wherein the measuring signal of the waste gas probe is characteristic for the air/fuel ratio in the respective cylinder of a first part of cylinders of the engine and a second waste gas probe having a second measuring signal is characteristic for the air/fuel ratio in a second group of cylinders of the engine and the detection of the measuring signal of the waste gas probe and the second waste gas probe are adjusted separately and related to the first and second part of cylinders of the engine.

* * * * *